Jan. 27, 1970   J. KERR ET AL   3,491,529
TEXTILE SPINNING SPINDLE ASSEMBLY
Filed Sept. 16, 1968   2 Sheets-Sheet 1

United States Patent Office 3,491,529
Patented Jan. 27, 1970

3,491,529
TEXTILE SPINNING SPINDLE ASSEMBLY
John Kerr, Cambuslang, and Duncan Gay, Glasgow, Scotland, assignors to National Research Development Corporation, London, England, a British corporation
Filed Sept. 16, 1968, Ser. No. 760,004
Claims priority, application Great Britain, Sept. 20, 1967, 42,861/67
Int. Cl. D01h 7/22, 7/12
U.S. Cl. 57—88                          4 Claims

ABSTRACT OF THE DISCLOSURE

A textile spinning spindle with the bobbin-receiving shaft mounted in hydrodynamic gas journal bearings of which the bearing sleeves are resiliently mounted. A thrust bearing preventing movement of the vertical shaft downwards under gravity. A brake for the shaft. The brake applying no radial forces to the shaft.

---

This invention relates to textile spinning spindle assemblies. Textile spinning spindles are known which include a shaft having a portion for receiving a bobbin. The shaft is mounted on a supporting framework through a bearing which is commonly a ball or roller bearing. Such ball or roller bearings require lubrication by oil. The presence of oil in proximity to textile yarn is undesirable.

It is an object of the present invention to provide a textile spinning spindle the bearing of which does not require lubrication.

According to the present invention there is provided a textile spinning spindle assembly comprising a shaft having a portion for receiving a bobbin and a portion disposed within a housing, means co-operating with a portion of the shaft within the housing for creating a hydrodynamic gas journal bearing upon rotation of the shaft, a thrust bearing for opposing movement of the bobbin-receiving portion of the shaft towards the housing, and a brake operable to oppose rotation of the shaft relative to the housing, the brake being so constructed that operation of the brake does not create any resultant radially directed thrust on the shaft.

The brake may include pads engageable with a radial surface of a member rotatable with the shaft.

The brake may include two spaced-apart radial surfaces facing one another and rotatable with the shaft, a first member fixed with respect to the housing and disposed between the two radial surfaces rotatable with the shaft, a second member movable axially relative to but held against rotation relative to the housing and means for moving the second member axially relative to the housing and into engagement with one of said radial surfaces rotatable with the shaft the arrangement being such that the other of said radial surfaces may be moved into contact with the said first member by reaction of the said one of said radial surfaces with said second member. The second member may include brake pads engageable with said one of said radial surfaces, and the first member may include brake pads engageable with said other of said radial surfaces.

The said means co-operating with a portion of the shaft within the housing for creating a hydrodynamic gas journal bearing may include a sleeve coaxial with the shaft and resiliently mounted from the housing.

There may be two hydrodynamic gas journal bearings for the shaft, each of said bearings including a sleeve coaxial with the shaft and resiliently mounted from the housing the two sleeves being spaced apart axially of the shaft.

The thrust bearing may include a projection on the end of the shaft remote from the bobbin-receiving portion of the shaft, the projection providing substantially point contact with a portion of the housing on the axis of the shaft.

An embodiment of the present invention will now be described, by way of example, with reference to the accompanying drawings in which.

Figure 1:
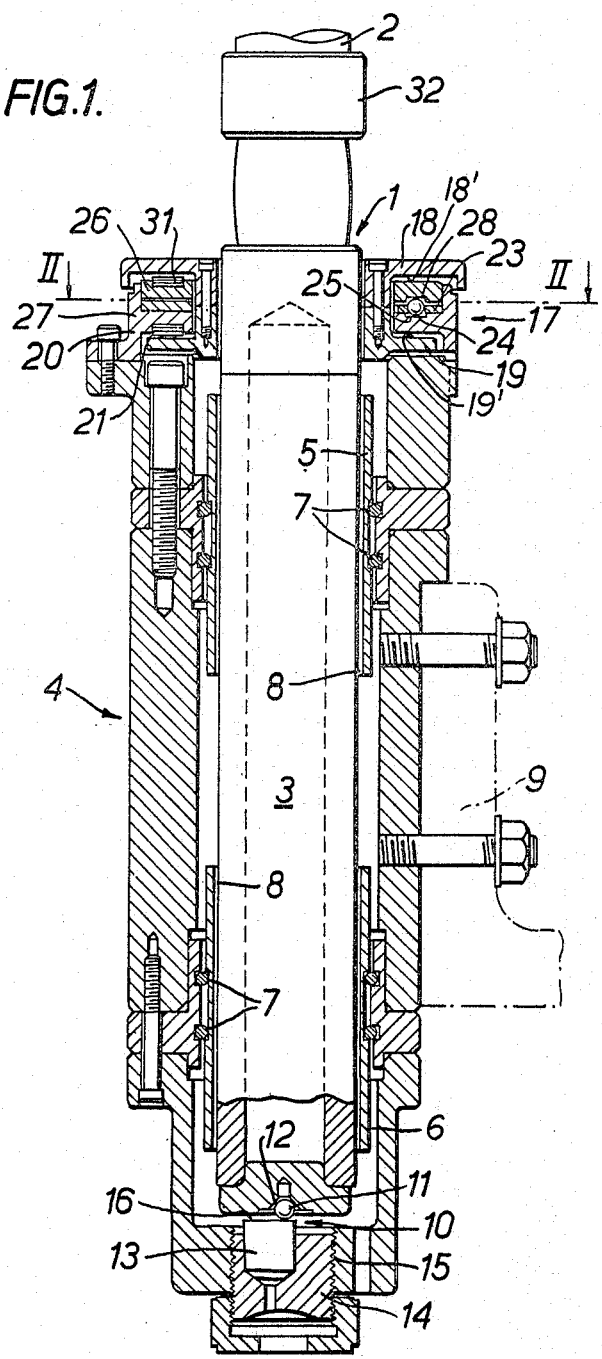
FIGURE 1 is an axial sectional view of a textile spinning spindle assembly embodying the present invention.
Figure 2:
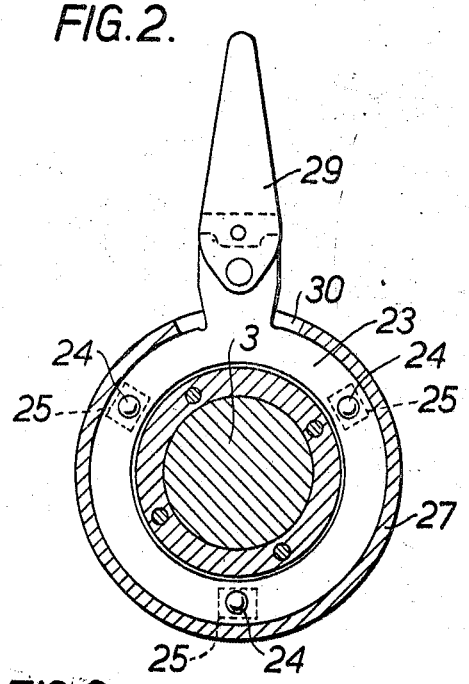
FIGURE 2 is a cross-sectional view on the line II—II in FIGURE 1.
Figure 3:
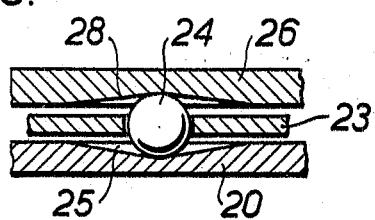
FIGURE 3 is a cross-sectional view on an enlarged scale, taken in a radial direction, of a portion of the brake arrangement.

The textile spinning spindle assembly illustrated in the drawings comprises a shaft 1, which is substantially vertical in use and a portion 2 of which carries, in use, a bobbin (not shown). Only a short portion of the shaft portion 2 is shown in FIGURE 1.

A portion 3 of the shaft 1 is disposed within a cylindrical housing 4. Two sleeves 5, 6 are disposed in the housing 4 coaxially with the shaft 1. The sleeves 5, 6 are formed of glass. The sleeves 5, 6 are carried by the housing 4 through resilient mounting means in the form of rubber O-rings 7 which allow the sleeves some small degree of freedom for radial movement relative to the housing 4. However, the O-rings 7 bias the sleeves 5, 6 to positions in which their axes are aligned. The clearances 8 between the shaft portion 3 and the sleeves 5, 6 are such that upon rotation of the shaft 1 relative to the housing 4, a hydrodynamic gas bearing condition is created between each of the sleeves 5, 6 and the shaft. As is known, a hydrodynamic gas bearing does not require lubrication.

The housing 4 is mounted from a frame (not shown) by a bracket 9 with the axis of the shaft 1 vertical and the bobbin-receiving portion 2 of the shaft disposed uppermost.

A thrust bearing 10 is provided to oppose downwards axial movement of the shaft 1 under the influence of gravity. The thrust bearing 10 includes a steel ball 11 mounted in a conical recess 12 on the axis of the shaft 1.

A thrust pad 13 formed of glass-impregnated nylon is disposed in an externally threaded plug 14 carried in an internally threaded aperture 15 in the lower end of the housing 4. The pad 13 is eccentric to but extends across the axis of the shaft 1 and may be rotated within the plug 14 so that the portion of the surface 16 of the pad 13 against which the ball 11 bears may be changed.

The plug 14 may be turned in order to adjust the position of the shaft 1 axially of the housing 4.

A brake 17 is provided for opposing rotation of the shaft 1 relative to the housing 4 so that the shaft 1 may be stopped, for example, when it is necessary to change the bobbin carried by the shaft portion 3 or when the yarn being spun and wound on to the bobbin breaks.

The brake 17 comprises two annular flanges 18, 19 carried by, for rotation with, the shaft 1. The flanges 18, 19 have radial surfaces 18', 19', respectively, which are spaced apart and face one another. The housing 4 has a radially inwardly directed flange 20 on the underside of which are mounted brake pads 21 which are engageable by the flange 19 if and when the shaft 1 is moved axially upwards.

Located at the upper side of the housing flange 20 is a camming device which comprises an annular member 23 having a plurality of circumferentially spaced apertures therein in each of which there is a ball 24 which is of a diameter greater than the thickness of the annular member 23.

Each of the balls 24 rests in a recess 25 of short arcuate length formed in the upper surface of the housing flange 20. The bottom of each recess 25 is of cam form in that it rises from a low position at the middle of its arcuate length to high positions at its ends in the arcuate direction.

Resting on the balls 24 is an annular brake shoe 26 which is movable in the axial direction of the shaft but is constrained against rotational movement by co-operation with a cylindricail extension 27 of the housing flange 20. Recesses 28 similar to the recesses 25 are formed on the underside of the brake shoe 26 and the upper portions of the balls are received in the recesses 28.

The annular member 23 has a radially outwardly directed arm 29 which extends outwardly through an aperture 30 in the cylindrical extension 27 of the housing flange 20. The aperture 30 subtends an angle at the axis of the shaft greater than the angle subtended by the recesses 25, 28 at the axis of the shaft so that the annular member 23 may be rotated relative to the housing 4 and shaft 1 in either sense in order to cause the balls 24 to move in the circumferential direction relative to the recesses 25, 28. Movement of the balls 24 away from their normal positions in which they are resting in the deepest parts of the recesses 25, 28 whereby the balls 24 and brake shoe 26 are at their lowest positions, causes the balls to rise relative to the housing flange 20, and the brake shoe 26 to rise relative to the balls 24. In this way, pads 31 on the brake shoe 26 are caused to engage the underside of the shaft flange 18 and thereby cause a light braking action. Continued rotation of the annular member 23 causes a further raising of the brake shoe 26 and this causes an upwards movement of the shaft 1 until the lower shaft flange 19 is brought into engagement with the brake pads 21 on the underside of the housing flange 20. Thus, the shaft 1 may readily be stopped and when so stopped the ball 11 of the thrust bearing is out of engagement with the thrust pad 13 and hence any large axially directed thrusts on the shaft during changing of a bobbin are not transmited through the shaft to the thrust pad 13 the surface of which might otherwise be damaged by the high pressure which would be exerted thereon by the ball 11 due to large downwards thrusts on the shaft 1.

The shaft is driven in rotation by a belt (not shown) which engages the shaft at the barrelled portion thereof designated 32. The belt is maintained in driving engagement with the shaft by a spring biassed idler pulley (not shown). When the shaft is braked the belt slips over the barrelled shaft portion 32. The purpose of the resilient mounting of the bearing sleeves is so that the shaft may rotate at speeds (e.g. 16,000 r.p.m.) which are greater than rotational speeds which are limited by half-speed whirl of the shaft. It has been found that by mounting the bearing sleeves in a resilient manner, allowing the sleeve some degree of freedom for radial movement and wherein radial movement is progressively opposed the half speed whirl motion of the shaft is controlled within safe limits and subsequent increase of the shaft speed causes the amplitude of the motion to decrease and finally to disappear. The resilient mounting of the bearing sleeves also allows the radial clearance between the shaft and the sleeves to be greater than would otherwise be possible and this ability to increase the clearances reduces the cost of manufacturing the shaft and sleeves.

It will be understood that with the form of brake described above, operation of the brake does not create a radially directed load on the shaft. Any resultant radial load on the shaft created by braking would be most undesirable in cases wherein the shaft is journalled in hydrodynamic gas bearings.

In the embodiment of the invention particularly described above, the resilient mountings for the bearing sleeves are rubber O-rings. However, it is to be understood that material other than rubber and members other then O-rings may be employed to resiliently mount the bearing sleeves. For example, if it is found that the mountings of the bearing sleeves are subjected to temperatures which would be destructive to rubber mountings, the mountings may be formed of a metal such as steel, or ceramic.

Whilst in the embodiment specifically described above, there are two hydrodynamic gas journal bearings, it will be realised that in certain embodiments a single hydrodynamic gas journal bearing may be used.

We claim:

1. A textile spinning spindle assembly comprising a housing, a shaft structure having a portion adapted to receive a bobbin and a portion disposed within said housing, means adapted to co-operate with a portion of said shaft structure within said housing to create a hydrodynamic gas journal bearing upon roation of said shaft structure, a thrust bearing adapted to oppose movement of the bobbin-receiving portion of said shaft structure towards said housing, a brake operable to oppose rotation of said shaft structure relative to said housing whereby only axially directed forces are applied to said shaft structure, and wherein said brake includes two spaced-apart radial surfaces facing one another and adapted to rotate with said shaft structure, a first member fixed with respect to said housing and disposed between said two radial surfaces adapted to rotate with said shaft structure, a second member adapted to move axially relative to but held against rotation relative to said housing, and means adapted to move said second member axially relative to the housing and into engagement with one of said radial surfaces adapted to rotate with said shaft structure, whereby further movement of said second member in engagement with said one said radial surfaces causes movement of the other of said radial surfaces into engagement with said first member.

2. A textile spinning spindle assembly according to claim 1. wherein said second member includes brake pads adapted to engage with said one of said radial surfaces and said first member includes brake pads adapted to engage with said other of said radial surfaces.

3. A textile spinning assembly according to claim 1. wherein said means adapted to move said second member axially relative to the housing includes an annular member disposed between said first and second members, said annular member having projections in axial directions and being adapted to engage with surfaces of said first and second members, said surfaces of said first and second members being inclined to a radial plane whereby upon rotational movement of said annular member said second member is moved axially towards said one of said radial surfaces by virtue of movement of said projections over said inclined surfaces.

4. A textile spinning spindle assembly according to claim 3, wherein said annular member includes an annulus having apertures therein, balls disposed one in each of said apertures, said balls being of a diameter greater than the thickness of said annulus, and a lever attached to said annulus and extending radially outwards.

References Cited

UNITED STATES PATENTS

| 1,869,632 | 8/1932 | Sweet | 57—134 |
| 2,699,033 | 1/1955 | Bell | 57—135 |
| 2,704,946 | 3/1955 | Gray et al. | 57—134 |
| 3,058,785 | 10/1962 | Steele | 308—9 |
| 3,415,050 | 12/1968 | Page | 57—88 |

FOREIGN PATENTS

| 574,131 | 4/1933 | Germany. |
| 610,614 | 10/1948 | Great Britain. |
| 912,606 | 12/1962 | Great Britain. |

JOHN PETRAKES, Primary Examiner